United States Patent [19]

Gore et al.

[11] 4,112,023

[45] Sep. 5, 1978

[54] MOULDING COMPOSITIONS

[75] Inventors: Christopher Robert Gore, Buntingford; Geoffrey George Arm, Welwyn Garden City, both of England

[73] Assignee: Imperial Chemical Industries Limited, London, England

[21] Appl. No.: 588,948

[22] Filed: Jun. 20, 1975

[30] Foreign Application Priority Data

Jul. 11, 1974 [GB] United Kingdom ............... 30724/74

[51] Int. Cl.² .................... C08L 33/08; C08L 33/10
[52] U.S. Cl. .................... 260/901; 260/876 R; 260/885; 264/16
[58] Field of Search ................ 260/901, 876 R, 885

[56] References Cited

U.S. PATENT DOCUMENTS

| 2,947,716 | 8/1960 | Cornell et al. | 260/901 |
| 3,649,608 | 3/1972 | Logemann et al. | 260/885 |
| 3,823,205 | 7/1974 | Zimmt | 260/901 |

*Primary Examiner*—Murray Tillman
*Assistant Examiner*—Thurman K. Page
*Attorney, Agent, or Firm*—Cushman, Darby & Cushman

[57] ABSTRACT

A blend of powders suitable for use in powder/liquid moulding applications comprising a high molecular weight polymer powder of methyl methacrylate and a methyl methacrylate copolymer powder containing more than 7% but less than 15% by weight of 2-ethyl hexyl acrylate, both powders having defined particle sizes.

10 Claims, No Drawings

MOULDING COMPOSITIONS

This invention relates to polymeric acrylic powders suitable for producing moulded articles, and in particular to such powders suitable for use in moulding processes involving powder/monomer mixtures.

The use of a technique in which a polymer powder, for example based on poly(methyl)methacrylate is mixed in a polymerisable liquid, such as methyl methacrylate, and the resulting resin mixture is cured in a mould is well known for producing shaped articles such as dental prostheses. The problems associated with such a process are to ensure, firstly, that the paste of powder and polymerisable liquid reaches a working consistency in as short a time as possible, hereinafter termed the dough time (DT). Secondly, after reaching a working consistency it is essential that the dough does not proceed rapidly to an unworkable consistency but stays in a workable condition for a sufficient period (hereinafter termed working life (WL) for it to be packed into a mould. Thirdly, after packing the mould the mixture of monomer and powder must be curable under controlled conditions so that the heat of polymerization generated does not result in bubbles being present in finished mouldings.

Materials are already available which have acceptably short dough times together with acceptably long working lives, but these materials still require to be cured over a long period (hereinafter termed the cure time (CT)) to avoid the formation of bubbles in the moulding.

A composition has now been developed which has the combined properties of short dough time and long working life and, in addition, can be cured rapidly without significant formation of bubbles in the moulding.

Accordingly there is provided a moulding composition comprising a blend of from 90–60% by weight of a high molecular weight polymer powder of methyl methacrylate, optionally containing up to 5% by weight of a copolymerizable monomer, having a reduced viscosity of greater than 6, preferably between 7 and 10 and having at least 80%, and preferably at least 90% by weight of its particles below 125 microns and at least 50% by weight above 45 microns in diameter, together with from 10–40% by weight of a copolymer powder of methyl methacrylate with more than 7% but less than 15% by weight of 2-ethyl hexyl acrylate, having a reduced viscosity of between 1.5 and 9, preferably between 2.5 and 4, and having less than 15% by weight of its particles greater than 125 microns in diameter. The copolymer preferably contains between 8 and 14%, more desirably between 10 and 12% by weight of 2-ethyl hexyl acrylate. The moulding composition preferably contains from 15 to 30% by weight of the copolymer powder.

The term "reduced viscosity" as used throughout this specification is used to signify the reduced viscosity of polymers determined as a 1% solution in chloroform at 25° C according to the method of British Standard 188.

The polymer powder composition of the invention is used to produce bubble-free mouldings at rapid cure rates by mixing the powder with a curable liquid, preferably containing a major proportion of methyl methacrylate, to give a paste containing about 70 to 75% by weight of polymer which is forced into a mould and cured at high temperatures, conveniently by plunging into a boiling water bath.

The particle size and molecular weight characteristics of the constituents of the composition are chosen to ensure that the composition gives the combined advantages of short dough time, long working life and short cure time, while at the same time giving cured products of an aesthetically pleasing appearance. Thus if the homopolymer constituent contains a substantial proportion by weight of particles above 125 microns in diameter cured mouldings of the composition will have a granular texture giving an impression of poor clarity. On the other hand if the homopolymer constitient contains more than 50% by weight of particles below 45 microns the working life of the composition is not sufficiently high to be acceptable in practice. In the case of the copolymer constituent a high proportion of granules above 125 microns in diameter leads to weak areas in the dough which can give rise to an unacceptable level of bubbling or porosity on curing at high rates. The restriction in concentration of more than 7% but less than 15% by weight of 2-ethyl hexyl acrylate in the copolymer constituent is necessary to ensure a suitable combination of dough time and working life. When the 2-ethyl hexyl acrylate concentration is not less than 15% by weight there is a tendency for the mouldings to contain bubbles when subjected to rapid cure rates. The amount of the copolymer constituent in the composition is chosen to give a desired maximum dough time and minimum working life with a substantial freedom from bubbling in a quick cure cycle. The proportion will depend on factors such as the comonomer content, the mean particle size, particle size distribution and reduced viscosity of the polymers but is generally in the range 10 to 40% by weight of the total composition.

The parameters dough time, working life and curing time are assessed under standard test conditions. After spatulating the monomer and polymer powder blend the material initially has a wet, sticky, sandy appearance as the monomer begins to swell the polymer. After a time a smooth dough-like material results which does not stick to the mixing vessel. The time taken to reach this stage is termed the dough time. After a further period of time the material will become rubbery and stiff and pieces of dough will not adhere to each other so that the material cannot be moulded properly. The period from reaching the dough stage until the material is no longer workable is called the working life. Under conditions of ambient temperature it is preferred that the dough time is less than 15 minutes and the working life at least 40 minutes.

The cure time of the compositions may be assessed by various tests which involve submerging a mould packed with the powder/liquid dough in boiling water. For example, using a denture flask of the dimensions described in the American Dental Association Specification No. 12 for denture base polymer (American National Standard Z156.12 — 1965) the cavity of the mould is packed with a dough made from the composition of the invention and then plunged in 2.5 liters of water at its boiling point in a glass beaker, then allowing the water to cool for 30 minutes. Subsequently, the mould is plunged into a further 2.5 liters of water and maintained at 100° C for a further 5 minutes. For certain compositions the cure may be complete after the first 30 minute period and the subsequent 5 minute period may not be required. In a further test which is a more severe test of the ability of the composition to be cured rapidly without bubbling the test conditions above may be employed except in that after plunging the flask into the boiling water the temperature of the water is restored to 100° C and then maintained at 100° C for a further 20 minutes. It will be appreciated that the polymerization conditions used in practice to give bubble-free mouldings will depend on the thickness of the article moulded but using the polymer powder of the invention conditions can be readily found by simple experiment which enable a given size of moulding to be produced without substantial bubbling under rapid cure conditions.

The catalyst for initiating the polymerization of the liquid in the liquid/powder dough may be any of the conventional free radical catalysts, optionally in the presence of an activator. Although these ingredients may be added to the liquid/powder blend it is preferred, for convenience, that in the preparation of the powder constituents of the composition at least one of the constituents is polymerised so as to have sufficient residual catalyst present in the powder particles to activate polymerization of the liquid monomer of the dough. Normally both polymer powders of the blend will contain residual catalyst. This residual catalyst may not be entirely accessible to the added liquid monomer and the accessibility will depend to some extent on the physical characteristics of the powders, particularly particle size. It is therefore difficult to quantify the amount of catalyst necessary to give a rapid cure free from bubbling in the specified cure cycles. As a rough guide it has been found that if the powder constituents are fully polymerized in the presence of between about 0.2% and 0.5% by weight of benzoyl peroxide using a polymerization schedule using temperatures from about 60° C. rising to about 100° C there will be sufficient residual catalyst to effect a complete cure of the dough under the conditions specified without substantial bubbling occurring. In practice an appropriate level of residual catalyst may be determined by simple experiment and this level may be obtained in the powder constituents by shortening or prolonging the polymerization cycle in the preparation of these constituents as appropriate. The preferred free radical catalyst for dental applications is benzoyl peroxide.

In addition to the catalysts and activators the polymerisable compositions may also contain materials, known as peak suppressors, which reduce the extent of the exothermic reaction and assist in preventing bubble formation. Examples of such materials are monocyclic terpenes such as dipentene, β and γ terpinene and terpinolene. These are normally effective at concentrations of from 0.005 to 0.5% by weight of the polymerizable liquid.

An important factor in the production of bubble free mouldings is the choice of the curable liquid. Whilst satisfactory performance under appropriate polymerization conditions can be achieved using a monoethylenically unsaturated monomer system it is preferred to use systems which contain some cross-linking monomers. A preferred curable liquid for use in dental applications contains methyl methacrylate together with between 0.5 and 25% by weight of a cross-linking agent such as glycol dimethacrylate. The use of such a polymerizable liquid reduces the risk of bubble formation and so permits greater latitude in the polymerization conditions.

The invention is further illustrated by way of the following examples in which Examples 1 to 5 illustrate the invention and Examples A and B are for comparative purposes only.

EXAMPLE 1

A bead polymer was prepared by polymerizing 100 parts of methyl methacrylate with 0.4 parts of benzoyl peroxide at a reaction temperature of 77°. The reaction temperature peaked to 89° C after 55 minutes and was heat treated for 20 minutes at 100° to complete the polymerization. The polymer produced had a reduced viscosity (RV) of 8.0 and a weight average particle size of 90$\mu$. Particles larger than 300$\mu$ were removed by sieving. Less than 15% by weight of particles were greater than 125$\mu$.

A copolymer was also prepared by polymerizing 88 parts of methyl methacrylate, 12 parts of 2-ethyl hexyl acrylate and 0.4 parts of benzoyl peroxide at a reaction temperature of 86°. The temperature peaked to 102° C after 40 minutes and was then heat treated at 100° C for a further 20 minutes. The copolymer produced had an RV of 3.5 and a weight average particle size of 80$\mu$. The polymer was sieved so as to remove particles larger than 300$\mu$. Less than 10% by weight of particles were greater than 125$\mu$.

24 grams of polymer granules composed of a mixture of 75 parts of the above homopolymer and 25 parts of the above copolymer were mixed with 10 ml of a liquid composed of 92 parts of methyl methacrylate, 8 parts of glycol dimethacrylate and 0.01 parts of dipentene. After about 13 minutes at 20° the mixture had reached a smooth, workable consistency and remained in this workable dough form for over an hour.

The dough was used to fill a mould comprising a dental flask as described in the American Dental Association Specification No. 12 and then cured by placing it into 2.5 liters of boiling water and allowing it to stand for 30 minutes. The mould was removed from the flask and was found to be substantially fully polymerised to a casting which was free from occluded bubbles.

EXAMPLE 2

A homopolymer in bead form was prepared as in Example 1 except that a slightly lower reaction temperature of 76° was used; the resulting RV was found to be 9.0.

A copolymer was also prepared by polymerizing 86 parts of methyl methacrylate, 14 parts of 2-ethyl hexyl acrylate and 0.3 parts of benzoyl peroxide at a reaction temperature of 85° C. The temperature peaked to 98° after 35 minutes and was then heat treated at 100° for 15 minutes. The copolymer produced had an RV of 2.6 and a weight average particle size of 40$\mu$. The copolymer was sieved to remove particles larger than 300$\mu$.

24 grams of a mixture of polymer granules containing 80 parts of the above homopolymer and 20 parts of the above copolymer were mixed with 10 ml of a liquid composed of 94 parts of methyl methacrylate, 6 parts of glycol dimethacrylate and 0.01 parts of dipentene.

After about 20 minutes the mixture had taken on a smooth workable consistency and remained in this dough form for over an hour. The dough was used to fill a dental flask as in Example 1 and this was cured by plunging into boiling water and standing for 30 minutes. The cured cast was free of bubbles.

EXAMPLE 3

A bead polymer was prepared by polymerizing 100 parts of methyl methacrylate with 0.3 parts of benzoyl peroxide at a reaction temperature of 77°. The reaction temperature peaked to 87° after 60 minutes and was heat treated for 15 minutes at 100° C to complete the polymerization. The polymer produced had an RV of 10 and a weight average particle size of 80μ. Particles larger than 300μ were removed by sieving.

A copolymer was also prepared by polymerizing 86 parts of methyl methacrylate, 14 parts of 2-ethyl hexyl acrylate and 0.4 parts of benzoyl peroxide at a reaction temperature of 86° C. The temperature peaked to 98° C after 50 minutes and was then heat treated at 100° for 20 minutes. The copolymer produced had an RV of 2.3 and a weight average particle size of 60μ. Particles larger than 300μ were removed by sieving.

24 grams of polymer granules composed of a mixture of 70 parts of the above homopolymer and 30 parts of the above copolymer were mixed with 10 ml of liquid composing 94 parts of methyl methacrylate, 6 parts of glycol dimethacrylate and 0.01 parts of dipentene.

After 10 minutes the mixture had achieved a smooth workable consistency and remained workable for over an hour. A test cast as used in Example 1 was plunged into boiling water and allowed to stand for 30 minutes. A bubble-free moulding was obtained.

EXAMPLE 4

A bead polymer was prepared as in Example 3. The polymer had an RV of 8.3 and a weight average size of 80μ.

A copolymer was also prepared by polymerising 90 parts of methyl methacrylate, 10 parts of 2-ethyl hexyl acrylate and 0.2 parts of benzoyl peroxide at a reaction temperature of 85° C. The temperature peaked to 101° C after 55 minutes and was then heat treated at 100° for a further 10 minutes. The copolymer produced had an RV of 5.3 and a weight average particle size of 80μ. Particles larger than 300μ were removed by sieving.

24 grams of polymer granules composed of a mixture of 80 parts of the above homopolymer and 20 parts of the above copolymer were mixed with 10 ml of a liquid composed of 94 parts of methyl methacrylate, 6 parts of glycol dimethacrylate and 0.01 parts of dipentene. After about 12 minutes at 21° the mixture had achieved a smooth workable consistency and remained workable in this workable form for at least an hour. The dough was used to fill a dental flask as in Example 1 and then cured by placing it into boiling water and allowing it to stand for 30 minutes. The cast produced was free of bubbles.

EXAMPLE 5

A homopolymer was prepared as in Example 1. The polymer had an RV of 8.2 and a weight average particle size of 90μ.

A copolymer was also prepared by polymerising 90 parts of methyl methacrylate, 10 parts of 2-ethyl hexyl acrylate and 0.3 parts of benzoyl peroxide at a reaction temperature of 85°. The reaction peaked to 100° after 55 minutes and was then heat treated for 15 minutes at 100°. The copolymer produced had an RV of 4.2 and a weight average particle size of 40μ. Particles larger than 300μ were removed by sieving.

24 grams of polymer granules composed of a mixture of 82 parts of the above homopolymer and 18 parts of the above copolymer were mixed with 10 ml of a liquid composed of 84 parts of methyl methacrylate 16 parts of glycol dimethacrylate and 0.01 parts of dipentene. After about 12 minutes at 21° the mixture had achieved a workable consistency and remained in this form for over an hour.

The dough was used to fill a mould as in Example 1 and then cured by placing it in boiling water and allowing it to stand for 30 minutes. The casting produced was clear and free of bubbles.

Comparative Example A

A bead homopolymer was prepared as in Example 1.

A copolymer was also prepared by polymerizing 20 parts of 2-ethyl hexyl acrylate 80 parts of methyl methacrylate and 0.5 parts of benzoyl peroxide at a reaction temperature of 80° C. The temperature peaked to 95° after 35 minutes and was then heat treated at 100° C for 25 minutes. The copolymer produced had an RV of 1.9 and weight average particle size of 50μ. The copolymer was sieved to remove particles greater than 300μ.

24 grams of a mixture of polymer granules containing 75 parts of the homopolymer described in Example 1 and 25 parts of the above copolymer were mixed with 10 ml of a liquid composed of 92 parts of methyl methacrylate, 8 parts of glycol dimethyacrylate and 0.01 parts of dipentene. A workable consistency was achieved only after 80 minutes at 20° although a working life of several hours was obtained. However when the dough was cured in the dental flask of Example 1 by placing in boiling water and allowing to stand for 30 minutes a porous cast was produced.

Comparative Example B

A bead polymer was prepared by polymerizing 100 parts of methyl methacrylate with 0.4 parts of benzoyl peroxide at a reaction temperature of 84°. The reaction peaked to 92° after 40 minutes and was heat treated at 100° for a further 20 minutes. The polymer produced had a reduced viscosity of 5.1 and a weight average particle size of 90μ. Particles larger than 300μ were removed by sieving.

A copolymer was also produced by polymerizing 90 parts of methyl methacrylate, 10 parts of 2-ethyl hexyl acrylate and 0.4 parts of benzoyl peroxide at a reaction temperature of 82°. The reaction temperature peaked to 99° after 50 minutes and was then heat treated at 100° for a further 20 minutes. The copolymer produced had an RV of 4.0 and a weight average particle size of 80μ. Particles larger than 300μ were removed by sieving.

24 grams of polymer granules composed of a mixture of 75 parts of the above homopolymer and 25 parts of the above copolymer were mixed with 10 ml of a liquid composed of 94 parts of methyl methacrylate, 6 parts of glycol dimethacrylate and 0.01 parts of dipentene. After about 13 minutes at 20° the mixture had reached a workable consistency and remained in this workable form for an hour. The dough was used to fill a mould of a dental flask as in Example 1 and then cured by placing it in boiling water and standing for 30 minutes. However, the cast produced was bubbled and would have been unacceptable in a denture.

We claim:

1. A moulding composition comprising a blend of from 90–60% by weight of a high molecular weight polymer powder of methyl methacrylate, optionally containing up to 5% by weight of a copolymerisable monomer, having a reduced viscosity of greater than 6 and having at least 80% by weight of its particles below 125 microns and at least 50% by weight above 45 microns, together with from 10–40% by weight of a copolymer powder of methyl methacrylate with more than 7% but less than 15% by weight of 2-ethyl hexyl acrylate having a reduced viscosity of between 1.5 and 9 and having less than 15% by weight of its particles greater than 125 microns.

2. A moulding composition according to claim 1 in which the copolymer contains from 10 to 12% by weight of 2-ethyl hexyl acrylate.

3. A moulding composition according to claim 1 in which the reduced viscosity of the copolymer is between 2.5 and 4.

4. A moulding composition according to claim 1 in which the reduced viscosity of the polymer powder of methyl methacrylate, optionally containing up to 5% by weight of a copolymerizable monomer, is between 7 and 10.

5. A moulding composition according to claim 1 comprising 85 to 70% by weight of the high molecular weight polymer powder of methyl methacrylate optionally containing up to 5% by weight of a copolymerizable monomer and 15 to 30% by weight of the copolymer powder.

6. A polymerisable composition comprising about 25 to 30% by weight of the composition of a polymerizable liquid consisting of a major proportion of methyl methacrylate and about 70 - 75% by weight of the composition of a powder blend according to claim 1.

7. A polymerizable composition according to claim 6 in which the polymerizable liquid contains from 0.5 to 25% by weight of the liquid of a cross-linking agent.

8. A polymerizable composition according to claim 6 which includes benzoyl peroxide as a catalyst for initiating polymerization of the polyermizable liquid.

9. A polymerizable composition according to claim 6 which includes from 0.005 to 0.5% by weight of the liquid of a peak suppressor.

10. A method of producing a shaped article comprising introducing a polymerizable composition according to claim 6 into a mould and polymerizing it to a solid condition by subjecting the mould to elevated temperatures.

* * * * *